United States Patent Office 3,019,093
Patented Jan. 30, 1962

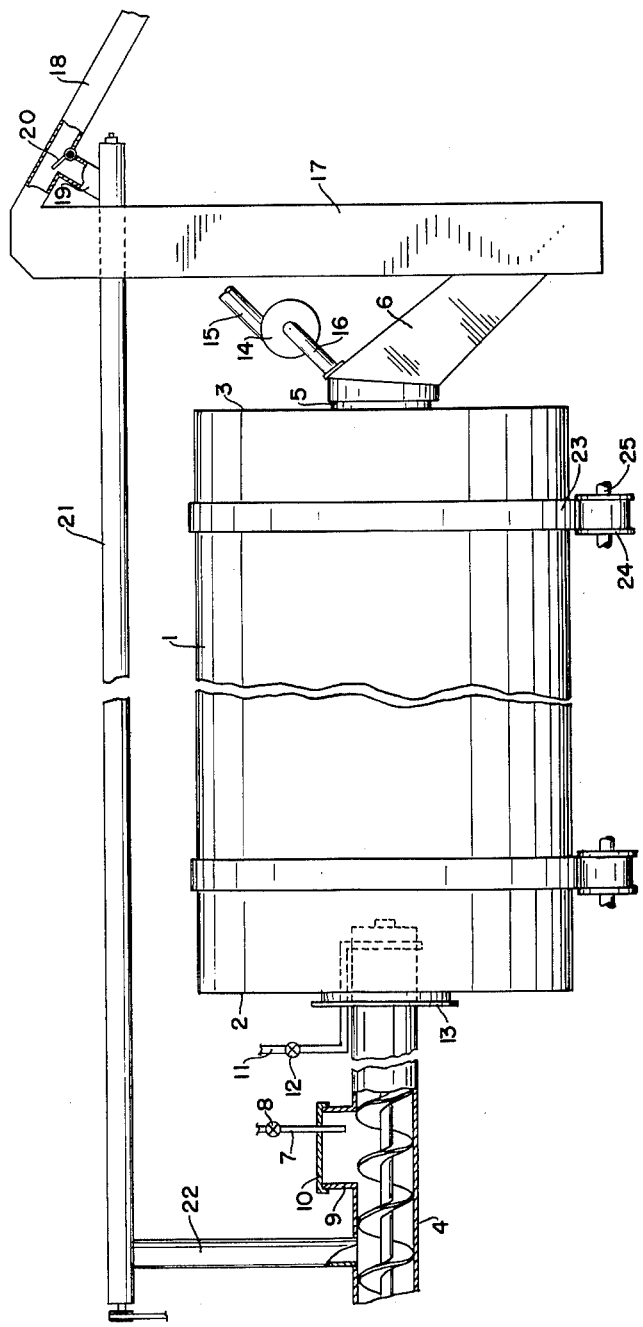

3,019,093
CARBON BLACK BEADING PROCESS
Roy L. Gholson, Monroe, La., assignor to Columbian Carbon Company, New York, N.Y., a corporation of Delaware
Filed Apr. 17, 1957, Ser. No. 653,331
3 Claims. (Cl. 23—314)

This invention relates to improvements in the pelleting or beading of carbon black.

Carbon black, as initially produced, is an extremely finely divided, flocculent powder of very low bulk density. The difficulties presented in handling, storing and shipping carbon black in this light flocculent form are well-known to the industry.

To avoid these difficulties, it is common practice of the carbon black industry to convert the flocculent powder to relatively dustless, free-flowing, generally spheroidal pellets or beads of considerably increased bulk density.

Two methods of thus beading carbon black have been proposed and widely used in the industry. One such method, known as the wet-beading process, is to vigorously agitate the powdered black with approximately an equal weight of water, as by means of a rotating shaft provided with projecting pins, whereby the black is converted to a cohering, wet or pasty mass, and continuing the agitation until the mass of black and water has been converted to tiny, spheroidal beads, which are thereafter dried to a low moisture content, usually not exceeding about 1% by weight, to produce substantially dustless free-flowing carbon black beads. This wet-beading process is exemplified by the procedure described and claimed in the Glaxner Patent Re. No. 21,379 and the Gohlson Patent 2,550,802.

According to the second method, known as the dry-beading process, the dry powdery black is subjected to continuous free tumbling in a slowly revolving, elongated, cylindrical tumbling drum, until the black has been formed into spheroidal beads. This type of operation is examplified by that described in the Glaxner Patent No. 2,187,601.

A disadvantage of the wet-beading process is that the resultant beads must be subjected to a final drying operation, necessary to remove from the beads a large amount of water, approximating the dry weight of the carbon black.

The dry-beading process has the advantage of producing more nearly spherical beads, with smoother surfaces, and also avoids the necessity of subsequently drying the beads. However, the dry-beading process has been subject to the disadvantages that the resultant beads are usually less resistant to crushing and packing, than are wet-process beads, and that the production rate, in apparatus of a given size, is relatively low, due to the high proportion of carbon black which must be recycled through the tumbling drum. Frequently, this recycled rate is as high as six parts of black recycled to each part of finished beads. This recycling has greatly decreased the capacity of the dry-beading apparatus.

My present invention provides an improved process whereby the disadvantages heretofore encountered in the previously available processes are entirely avoided or greatly minimized. The resultant beads are characteristic of dry-process beads, with respect to surface appearance, but production rate is greatly increased due to a reduction, or even elimination, of the customary recycling. Also, beads produced by my improved process are more resistant to crushing and packing than are conveniently made dry-process beads.

My improved process is essentially a dry-beading process in that the beads are formed by freely tumbling the carbon black, in a tumbling drum for instance, while in an apparently dry, powdery condition. However, it is distinguished from the conventional dry-beading process in that I absorb in the carbon black while the black is in a flocculent state prior to, or upon initiation of, the tumbling operation, a minor proportion of water, insufficient to wet the black, or change it from its flocculent powdery condition. The water so added to the black is completely absorbed by the black, so that the black appears to be perfectly dry and remains a non-cohering powder, i.e. it is in no sense a paste and will not cohere when squeezed in the hand. This condition is essential in order that the tumbling be effective.

The optimum proportion of water added to the black, in accordance with my present process, will vary somewhat depending upon the characteristics of the black and also upon the intended subsequent treatment of the black, as hereinafter more fully described, but will not exceed about ⅓ the dry weight of the black. Usually, most advantageous results are obtained with an amount of water within the range of 15–20% on the dry weight basis, but where the black is not to be subjected to a final drying operation, the proportion of water should not exceed about 6%.

This invention is applicable to the production of finished beads or may, with advantage, be used as a preliminary step in an operation in which the resultant beaded carbon black is subjected to further treatment for producing beads having still greater resistance to crushing and packing.

For instance, the present process is especially useful in forming dry-process beads of sufficient bulk density for "case-hardening," in accordance with the invention of copending application Ser. No. 630,225, filed December 24, 1956, now U.S. Patent 2,900,737, whereby preformed, dry-process beads, having a bulk density of at least 20.5 pounds per cubic foot, are surface wetted with water in proportions within the range of 40 pounds to 90 pounds of water per 100 pounds of dry-process beads and thereafter dried to a moisture content not exceeding about 1% by weight. It is also useful for the preforming of dry-process beads for subsequent treatment in accordance with copending application Ser. No. 639,614, filed February 12, 1957, whereby preformed dry-process beads are broken up and thereafter subjected to a wet-beading operation followed by drying.

Thus in accordance with each of the processes of those pending applications, the resultant beads are subjected to a final drying operation. Therefore, where the present invention is used as a preliminary step to produce beads for subsequent treatment according to one of those processes, the optimum amount of water, up to ⅓ the dry weight of the black, may be used without regard to water content of the resultant dry-process beads.

In the manufacture of carbon black, it is customary to pass the black to the beading operation while still at an elevated temperature. Also, in the dry-beading operation, a substantial amount of heat is generated by friction due to the tumbling of the black.

I have found that the heat thus present or generated is generally adequate to vaporize a substantial proportion of water from the black during the tumbling operation and that where the amount of water absorbed in the black, in accordance with my present invention, does not exceed about 6%, dry-weight basis, the water remaining in the resultant beads is usually reduced to an acceptable value, of the order of 1% or less, without subsequent drying.

The invention will be further described and illustrated with reference to the accompanying drawing which represents diagrammatically and conventionally a type of apparatus adapted to the carrying out of my improved dry-beading process.

In the single figure of the drawing, an elongated, cylindrical tumbling drum is indicated at 1 and is rotatably supported in any conventional manner known to the art.

The respective ends of the drum are closed in the usual manner as by means of metal end-plates 2 and 3, the respective end-plates being provided with centrally positioned openings for charging the powdered black to the drum and discharging the beads therefrom. Entering the drum through the closure plate 2 in the upstream end of the drum, there is a screw conveyor 4 leading from the source of supply of the flocculent carbon black. Extending through the central opening in the downstream end-plate 3, there is a discharge conduit 5 leading to chute 6. A water supply conduit 7 equipped with control valve 8 is positioned to discharge into the conveyor through a hand hole 9 closed by cover plate 10. A second water supply line 11 equipped with control valve 12 is provided for discharging water into the forward end of the drum when desired. The screw conveyor is sealed into the forward end of the drum by means of a sealing member 13. A suction fan 14, having a discharge conduit 15 and connected to the chute by conduit 16, is provided for drawing moisture-laden air from the system.

In the particular apparatus shown, the chute 6 discharges into the lower end of an elevator 17, e.g. a bucket elevator, which feeds at its upper end into gravity chute 18 leading to storage. Extending downwardly from chute 18 is a recycle chute 19 provided at its juncture with chute 18 with an adjustable, proportioning damper 20, adapted to control the proportion of beads to be recycled through the system.

The chute 19 discharges at its lower end into conveyor 21, advantageously of the screw conveyor type, by which the recycle is discharged through stand pipe 22 into screw conveyor 4 and thus returned to the tumbling drum.

As previously noted, the tumbling drum may be supported and rotated by means well-known to the art. In the apparatus shown, the drum is provided near each end with a projecting collar 23 adapted to cooperate with flanged power-driven rollers 24, suitably supported by shafts 25. It will be understood that a pair of rollers is provided at each end of the drum positioned on opposite sides of the center of gravity thereof to provide lateral support, as well-known to this industry.

In operation, the substantially dry, flocculent carbon black is conveyed from any convenient source, for instance a bolting tank not shown, into the forward end of the drum by screw conveyor 4. As the black passes through the conveyor at a uniform rate, a carefully regulated amount of water is added thereto through water supply conduit 7. Or as an alternative, the water may be added to the black after, it has entered the drum, through water supply conduit 11. Or where desired, a portion of the water may be added through conduit 7 and a further portion through conduit 11. The position of conduit 7 with respect to the discharge of conveyor 4 into the drum does not appear to be critical. I have, with advantage, introduced the water into the conveyor immediately ahead of its discharge into the drum or at a point as much as 20 feet from the drum with equally advantageous results. The water is mixed with the carbon black by the screw conveyor or by tumbling in the upstream end of the drum or by both means, and is completely absorbed by the black, as previously described. The water should be introduced in the form of a relatively fine spray to promote even distribution in the black.

The resultant, apparently dry, black is subjected to free tumbling as it passes through the drum, as in conventional dry-beading practice where no water is added, and the resultant beads are discharged from the drum through chute 6. Where desired, a portion of the discharged beads may be recycled to the system by way of conveyor 21, but, as previously noted, the proportion of recycle is much smaller than normally required and frequently recycling may be entirely eliminated.

A considerable portion of the added water is vaporized during the tumbling operation, and the resultant water vapor is drawn from the drum by suction fan 14. Where the amount of water added is small, as previously noted, the beads discharged from the drum are substantially dry. Where larger amounts of water are added, the discharged beads may be subsequently dried by conventional methods.

In addition to increasing the optimum feed rate and capacity of the apparatus by reducing the recycle, the present invention provides means for increasing the hardness and density of the beaded black and also means whereby the size of the resultant beads may be varied. The effectiveness of the process in increasing the size of beads is illustrated by the following examples:

*Example I*

In this operation, an ISAF type of carbon black in flocculent form was charged at the rate of 17,000 pounds per day to a conventional tumbling drum 7 feet in diameter and 24 feet long, provided with an outlet dam 31 inches high and rotated at 24 r.p.m. In one run, the dry-beading operation was carried out with no addition of water to the black. Thereafter, the operation was repeated using the same type of black in which there had been absorbed 22% of water (dry-weight basis). The beads resulting from each of the operations was screened through 20, 30, 40, 60 and 100 mesh screens (United States screen sizes) with the following results, the figures tabulated below representing the weight percentage of beads retained on the indicated screens:

| Mesh Size | 20 | 30 | 40 | 60 | 100 |
|---|---|---|---|---|---|
| No Water Added | 1.0 | 2.0 | 16.8 | 58.0 | 20.1 |
| 22% Water Added | 19.0 | 39.0 | 29.0 | 9.0 | 2.5 |

Where no water was added, 2.1% passed through the 100 mesh screen as fines. Where water was used, the percentage of fines was reduced to 1.5. The amount of water present in the beads passing from the tumbling drum was 4.5%.

The effectiveness of the invention in increasing size and hardness of the resultant beads is further illustrated by the following example, which also illustrates the effects of varying feed rates, recycled rates and amounts of water used:

*Example II*

In this operation, an ISAF type black was charged to a tumbling drum 6 feet in diameter and 24 feet long equipped with a 27½ inch outlet dam and rotated at 20 r.p.m. Two runs were made at different feed rates, recycled rates and using differing proportions of water. For comparative purposes, identical runs were made in which no water was used. Operating conditions and the characteristics of the resultant beads are set forth in the following tabulation:

| Run # | 1 | 1a | 2 | 2a |
|---|---|---|---|---|
| Feed Rate, lbs./day | 7,200 | 7,200 | 9,400 | 9,400 |
| Recycle Rate, lbs./day | 23,000 | 23,000 | 14,400 | 14,400 |
| Water added, percent | 12.9 | None | 6.5 | None |
| Moisture at outlet, percent | 2.9 | | 2.1 | |
| Crushing strength, grs. | 3.6 | 2.9 | 3.2 | 2.8 |
| Packing Point, lbs. | 52.5+ | 50. | 50 | 42.5 |
| Density, lbs./sq. ft. | 24.5 | 23.5 | 23.6 | 24.0 |
| Screen size, percent: | | | | |
| 20 mesh | 2.4 | 3.0 | 1.3 | 1.5 |
| 30 mesh | 24.8 | 9.1 | 12.6 | 5.6 |
| 40 mesh | 37.7 | 26.2 | 32.0 | 22.7 |
| 60 mesh | 28.4 | 35.9 | 37.0 | 47.1 |
| 100 mesh | 6.0 | 19.6 | 14.4 | 19.7 |
| Fines | 0.7 | 6.2 | 2.7 | 3.4 |

The effectiveness of the invention in increasing hardness and varying the size of the resultant beads is further illustrated by the following example:

Example III

In this operation, a HAF type black was charged at the rate of 15,000 pounds per day to a tumbling drum 6 feet in diameter and 24 feet long. In runs 3 and 3a, the drum was rotated at 23 r.p.m. and in runs 4 and 4a, the drum was rotated at 14 r.p.m. In runs 3 and 4, 4% of water was preliminarily absorbed in the black. For comparative purposes, identical runs 3a and 4a were made in which no water was used. The density, crushing strength and size of the resultant beads are set forth in the following tabulation:

| Run # | 3 | 3a | 4 | 4a |
|---|---|---|---|---|
| Crushing Strength, grs | 2.7 | 2.2 | 2.8 | 1.7 |
| Density, lbs./sq. ft | 23.4 | 22.4 | 24.3 | 24.1 |
| Screen size, percent: | | | | |
| 20 | .2 | .9 | 8.1 | 1.3 |
| 30 | 6.2 | 8.6 | 44.9 | 23.9 |
| 60 | 78.0 | 69.5 | 44.1 | 63.8 |
| 100 | 12.5 | 15.9 | 2.3 | 9.2 |
| Fines | 3.1 | 5.1 | .6 | 1.8 |

Water present in the finished beads, discharged from the drum, in runs 3 and 4, was 1.5%.

In addition to the advantages just illustrated, the capacity of a beading drum of given size is greatly increased in accordance with my present process. For example, in the beading of a carbon black of the FEF type in a tumbling drum 6 feet in diameter and 24 feet long, it was found that the optimum feed rate was 13,000 pounds per day, the drum being rotated at 9.8 r.p.m. By the preadsorption of 15% of water on the carbon black, the optimum feed rate was increased to 27,000 pounds per day, the rotation of the drum being 12.5 r.p.m.

A further advantage of the invention is that when operating in accordance therewith, even at high feed rates and little or no recycling, the danger of "dust outs," i.e. a reconversion of the beads within the drum to powdered carbon black, is substantially eliminated. Excellent results have been obtained in operations in which the ratio of recycle rate to feed rate was about 1.5:1. With some types of carbon black, difficulties have been encountered when lower recycle ratios were used. With other types of black, no recycle is necessary when the optimum amount of water is used.

The optimum amount of water to be absorbed on the black in order to increase beading rate and minimize the necessity of recycle has been found to vary somewhat with the type of carbon black. With an HAF type black, for instance a proportion of water within the range of 6%–20%, dry-weight basis, has been found to give excellent results. For a FEF type black, proportions of water within the range of 15%–20% have been used with maximum advantage, while with an ISAF type black, optimum proportions are within the range of 15%–30%. Most advantageously, the proportion of water should not be less than about 3%, dry-weight basis, and excellent results are generally obtained with most carbon blacks using proportions of water within the range of 15%–20%.

Where desired, various binders or other additives may be incorporated in the black by including such material in the water preliminarily absorbed in the black.

I claim:

1. A process for the beading of carbon black by freely tumbling the black in a beading zone in the absence of recycle beads until it has formed into substantially spheroidal dustless beads, the steps which consist essentially of completely absorbing in the black, while the black is in a flocculent state, an amount of water insufficient visibly to wet the black and insufficient to destroy its flocculent characteristics, not less than 3% and not exceeding one-third the dry weight of the black, thereafter introducing the fluocculent black containing the absorbed water into the beading zone, and converting the black to beads in the beading zone without further addition of water.

2. The process of claim 1 in which the proportion of water preliminarily absorbed on the carbon black is within the range of 15%–20% of the dry-weight of the black.

3. The process of claim 1 in which the amount of water preliminarily absorbed on the black does not exceed 6% of the dry-weight of the black.

References Cited in the file of this patent

UNITED STATES PATENTS

| | | |
|---|---|---|
| 2,131,686 | Heller et al. | Sept. 27, 1938 |
| 2,213,056 | Skoog et al. | Aug. 27, 1940 |
| 2,500,968 | Venuto | Mar. 21, 1950 |
| 2,502,106 | Skoog et al. | Mar. 28, 1950 |
| 2,834,044 | Antonsen et al. | May 13, 1958 |
| 2,835,562 | Boyer et al. | May 20, 1958 |
| 2,844,445 | Webster et al. | July 22, 1958 |
| 2,880,519 | Pollock | Apr. 7, 1959 |
| 2,890,942 | Webster et al. | June 16, 1959 |

FOREIGN PATENTS

| | | |
|---|---|---|
| 688,776 | Great Britain | Mar. 11, 1953 |